Jan. 20, 1959

J. R. BROWN 2,869,368

ELECTRICAL WATER GAUGE

Filed Aug. 5, 1955

INVENTOR.
JOHN R. BROWN
BY Woodling & Krost,
 atty.

Jan. 20, 1959    J. R. BROWN    2,869,368
ELECTRICAL WATER GAUGE
Filed Aug. 5, 1955    2 Sheets-Sheet 2

INVENTOR.
JOHN R. BROWN
BY Woodling and Krost,
attys.

United States Patent Office 2,869,368
Patented Jan. 20, 1959

2,869,368

ELECTRICAL WATER GAUGE

John Rowland Brown, Cleveland, Ohio, assignor to The Reliance Gauge Column Company, a corporation of Ohio Application August 5, 1955, Serial No. 526,640

9 Claims. (Cl. 73—304)

The invention relates in general to liquid level gauges and more particularly to water gauges for use with high pressure steam boilers wherein an electrical indication of the water level in the boiler may be transmitted to a control panel to establish illumination of electrical lamps for the remote indication of this liquid level.

The prior art has shown many forms of liquid level gauges and gauges for steam boilers in particular. Many of these prior art forms included a transparent gauge glass for direct visual observance of the water level in the boiler. As the steam boilers were improved, the pressures increased and gauge glasses of increasing strength were required. At operating pressures of steam boilers today, which may be in the order of 2000 to 2500 p. s. i., the use of a gauge glass becomes increasingly hazardous because the glass is frangible and lacks the necessary strength to withstand such high pressures, and the possibility of high pressure steam escaping from the boiler because of a broken gauge glass practically eliminates the possibility of utilizing such direct visual means.

Other prior art forms had incorporated fluid lines from the boiler to a control panel, for example, whereat a fluid operated level gauge was mounted and operated by the change in water level in the boiler. This offered the advantage of remote indication at the control panel rather than at the boiler water level; yet again as steam boiler pressures increased, the danger of having high pressure steam and/or water lines at the control panel increased to the point where it was no longer considered safe.

Therefore, an object of the present invention is to provide a steam boiler water level remote indicator which is safe in operation at all boiler pressures.

Another object of the invention is to provide a remote indicating electrical water gauge which may be mounted anywhere convenient and is not limited in its mounting position by the position of the boiler or by the consideration of accessibility thereto by steam and/or water lines from the boiler.

Another object of the invention is to provide a remote indicating liquid gauge incorporating electrical probes extending into a water tube with a remote indication dependent upon an electrical difference between certain probes immersed in the water and other probes not so immersed.

Another object of the invention is to provide an electrical water gauge incorporating a water tube which is mounted at an acute angle to the horizontal and to the vertical so that the physical spacing between electrical probes is greater than the vertical spacing between the probes to increase the electrical impedance between probes yet retaining close vertical spacing of the probes.

Another object of the invention is to provide an electrical water gauge utilizing a water tube at an acute angle to the vertical wherein electrical probes have probe elements insulatively extending into the water tube with the insulation of the probes thereby also established at an acute angle to the horizontal to prevent sediment and other foreign matter from accumulating on the probe insulators so that the probes will not become electrically shorted.

Another object of the invention is to provide an electrical water gauge wherein there is no danger of gauge glass breakage or other dangerous operating conditions regardless of the pressure of the water being measured.

Another object of the invention is to provide an electrical water gauge wherein a voltage is impressed upon different probes in a water tube with this impressed voltage causing current flow on the probe elements which are immersed in the water for causing an indication by red and green lights, and with the red and green lights establishing a red column positioned above a green column with the junction therebetween indicating the water level.

Another object of the invention is to provide an electrical water gauge with a remote electrical indicating means of red and green lights wherein there is a positive indication as to the operativeness of the gauge at all times to clearly indicate when an electrical lamp has become defective.

Another object of the invention is to provide an electrical water gauge utilizing electromagnetic devices connected to probe elements in a water tube where these electromagnetic devices provide indication by selecting red and green lights.

Another object of the invention is to utilize a liquid level gauge having a row of electrical probes with the probes being immersible in fluids of high and low impedance with an interface therebetween changeable in level in accordance with the level of the liquid being measured and with the high and low impedance fluids effecting an electrical indication of this liquid level.

Another object of the invention is to provide an electrical water gauge utilizing a series of electrical probes plus a common probe wherein the common probe is insulated from the water tube mounting all of the probes so that a shorting of any one of the probes does not provide a false indication.

Other objects and a fuller understanding of this invention may be had by referring to the following description and claims, taken in conjunction with the accompanying drawings, in which:

Figure 1:
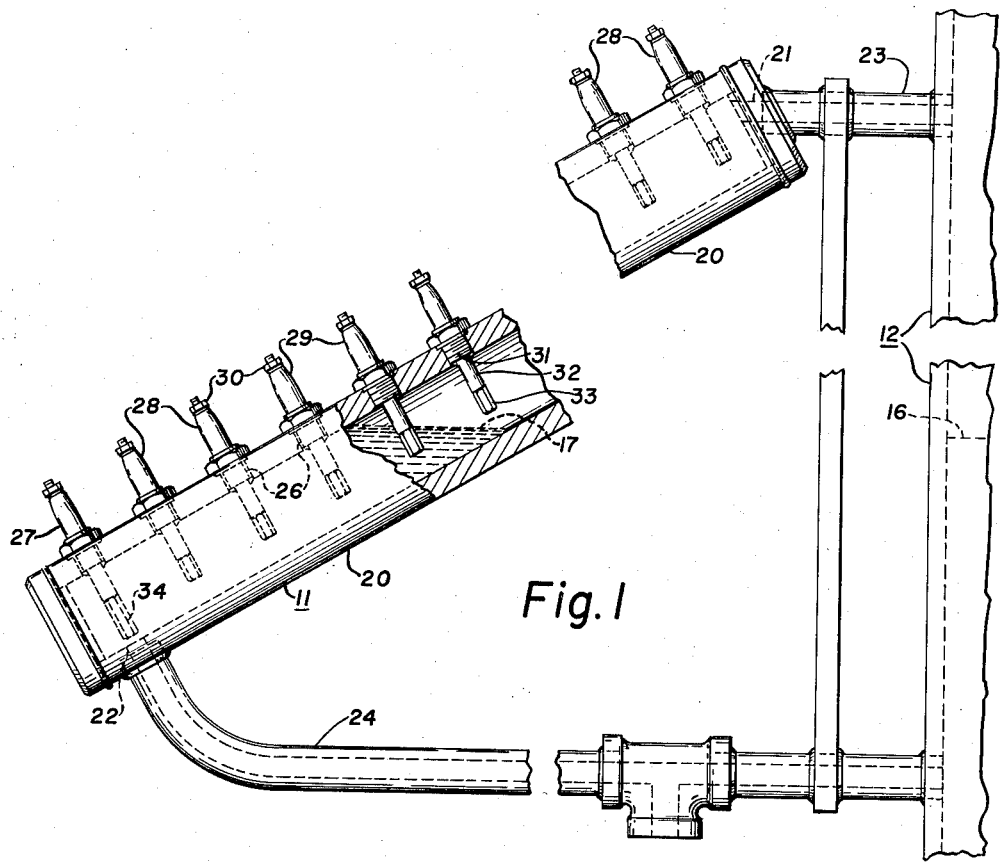
Figure 1 is a side view of a water tube used in the electrical water gauge.
Figure 2:
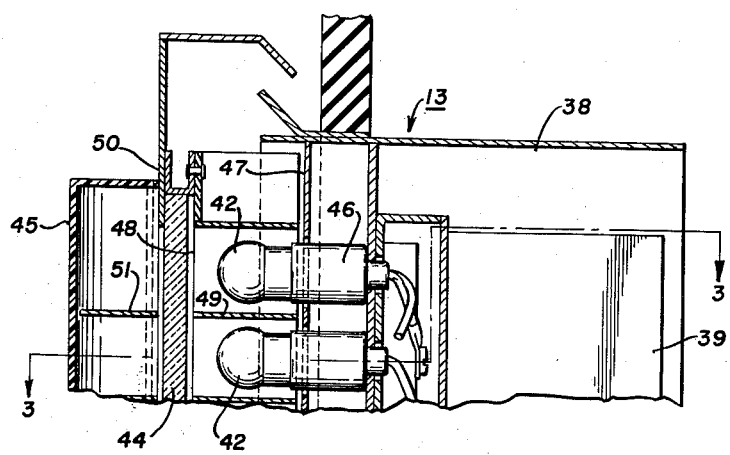
Figure 2 is a side view of the lamp housing in the water gauge.
Figures 3, 4:
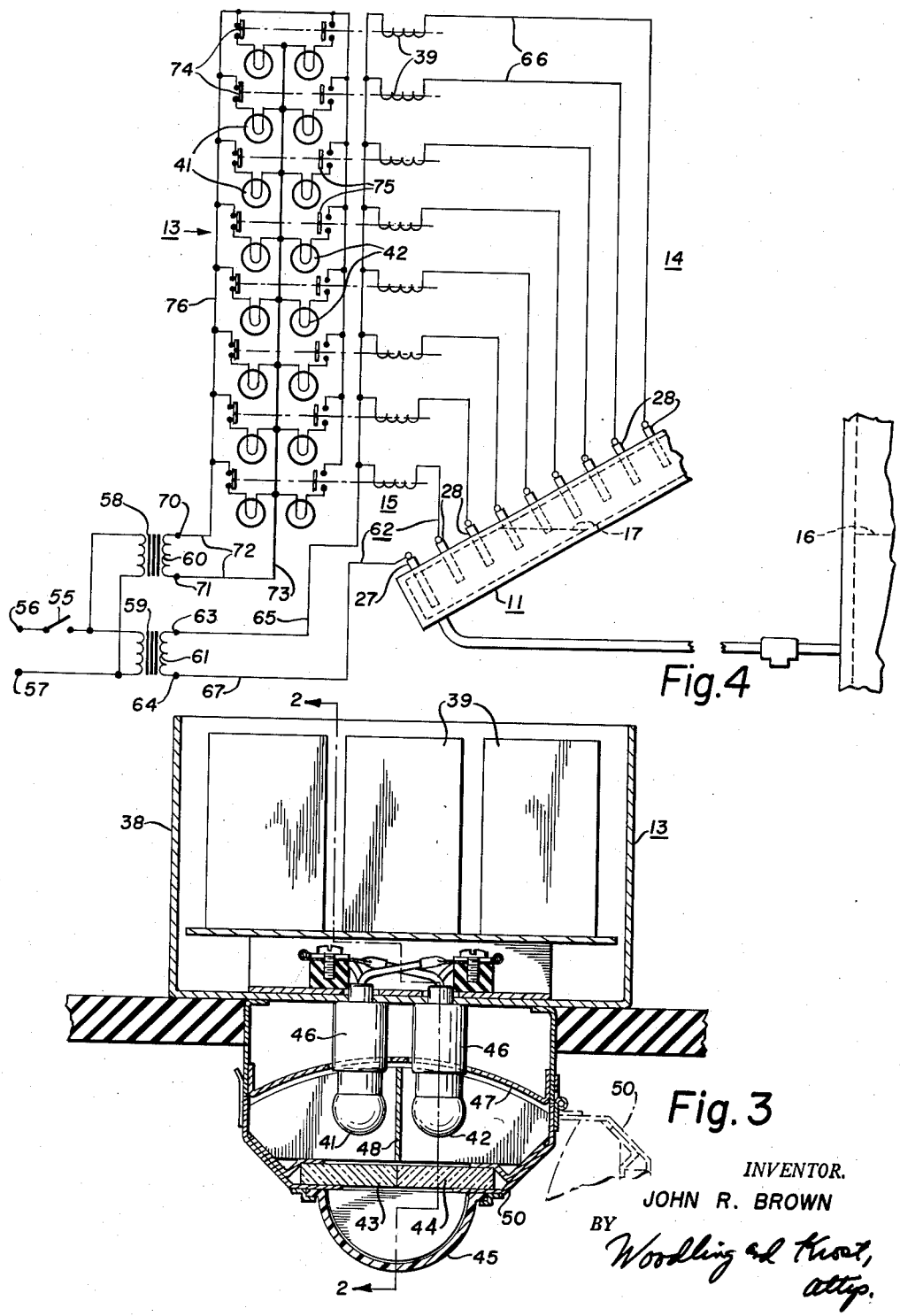
Figure 3 is a sectional view on the line 3—3 of Figure 2.
Figure 4 is an electrical circuit diagram of the entire water gauge.

The Figure 1 illustrates a water tube 11 which may be connected to a boiler 12 for indicating the water level therein by being electrically connected to a lamp housing 13 shown in Figures 2 and 3 by means of the electrical circuit 14 of Figure 4. The entire electrical water gauge 15 of the invention is diagrammatically shown in Figure 4 and has been illustrated in Figure 1 as being connected to a boiler 12 for indication of the water level 16 therein, although it will be understood that this is merely illustrative and is not to be construed as limiting the use of the water gauge 15. The boiler 12 represents a tank or reservoir having the liquid level 16 to establish a corresponding liquid level 17 in the water tube 11. The water tube 11 includes a pipe 20 having a top end connection 21 and a bottom end connection 22. An upper tube 23 and a lower tube 24 connect the top and bottom end connections to the boiler 12 above and below the expected variations in water level in the boiler.

A series of tapped holes 26 are provided in the upper side wall of the pipe 20 so that these tapped holes are established in a vertical plane. A common probe 27 is provided at the lowermost hole 26 and a longitudinal row of electrical probes 28 is provided in the remaining tapped holes 26. The electrical probes 28 may be considered to be indicator probes and these may be identical. Each probe has an external insulator 29, an external terminal 30, a male thread 31, an internal insulator 32, and an internal probe element 33 which is electrically connected to the external terminal 30. The common probe 27 may be practically identical but preferably includes a longer probe element 34 for a larger area for current conduction.

The Figure 4 shows diagrammatically the water tube 11 with its row of probes, and it will be understood that any desired number of probes may be used dependent upon the degree of indication required. This Figure 4 also shows diagrammatically the lamp housing 13, the construction details of which are shown in Figures 2 and 3.

These Figures 2 and 3 show that the lamp housing 13 includes a frame 38 which houses a plurality of probe relays 39. First and second pluralities of lamps 41 and 42, respectively, are also mounted in the frame 38 in vertical coextensive rows. The first plurality of lamps 41 may be known as red lamps and the second plurality of lamps 42 may be known as green lamps. The actual lamps need not be colored because in this preferred embodiment there is provided a red filter 43 and a green filter 44 positioned in front of the first and second pluralities of lamps, respectively, and positioned between these lamps and a translucent cover 45. The lamps are carried in lamp sockets 46 mounted on the frame 38, and the lamps proper are in front of a reflector 47. A vertical baffle 48 is provided between the first and second pluralities of lamps and horizontal baffles 49 are provided between each horizontally disposed pair of lamps. A hinged front cover 50 is mounted to the frame 38 and carries the filters 43 and 44 and the translucent cover 45 and also carries additional horizontal baffles 51 aligned with the horizontal baffles 49. The translucent cover 45 is preferably translucent rather than transparent in order to spread uniformly the light transmitted thereto by either the red or green filters.

Also, the horizontal baffles 51 together with the horizontal baffles 49 establish vertically spaced sections of the translucent cover 45 either as all red or all green in color dependent on which of the lamps in a vertically spaced compartment is illuminated.

*Electrical circuit*

The Figure 4 shows the electrical circuit 14 and diagrammatically the entire electrical water gauge 15. Terminals 56 and 57 are adapted to be connected to any suitable voltage source, such as 115 volt, 60 cycle, alternating current supply. First and second transformers 58 and 59 are connected in parallel and to the terminals 56 and 57 through a main switch 55, with the first transformer 58 having a low voltage secondary 60 and the second transformer 59 having a high voltage secondary 61. The high voltage secondary 61 supplies a high voltage circuit 62 from its terminals 63 and 64. The first terminal 63 is connected by a lead 65 to one terminal of each of the probe relays 39. The other terminal of each of the probe relays 39 is connected by probe leads 66 to a corresponding electrical indicator probe 28, and the common probe 27 is connected by a lead 67 to the second high voltage terminal 64.

The low voltage secondary 60 has terminals 70 and 71 supplying a low voltage circuit 72. The low voltage terminal 71 is connected by a common lead 73 to each of the lamps in both pluralities or series of lamps. Each of the probe relays 39 controls a normally closed contact 74 and a normally open contact 75. A lead 76 extends from the low voltage terminal 70 to each of the contacts 74 and 75. The low voltage circuit 72 thus extends from the terminal 70 through each of the normally closed contacts 74 to a lamp in the first plurality of red lamps 41 to return via the common lead 73 to the low voltage terminal 71. This low voltage circuit 72 also extends from the low voltage terminal 70 through the lead 76 and through each of the normally open contacts 75 to a different lamp in the second plurality of green lamps 42 to return via the common lead 73 to the low voltage terminal 71.

*Operation*

The operation is best described by referring to Figure 4 which diagrammatically illustrates the complete water gauge 15. The water level 16 in the tank or boiler 12 may vary within limits, and the water tube 11 has the position of its end connections and its length so chosen as to be above and below the anticipated water level 16. This water level, therefore, establishes a corresponding water level 17 in the tube 11 with steam above it. This steam and water is, of course, at the same pressure and essentially the same temperature as that in the boiler 12; and the water level 17 may be considered as an interface between first and second fluids in the water tube 12 with the interface being variable in level in accordance with the water level 16. As shown, the first four indicator probes are immersed in the water, and the water may be considered a first fluid which has a relatively low impedance relative to the electrical impedance of the steam in which the remaining indicator probes may be considered to be immersed. It will be noted that the common probe 27 is an electrical common for completing the circuit to each of the indicating probes 28. The high voltage circuit 62, which may be in the order of 250 volts, for example, thus impresses a voltage on each of the first four indicator probes 28 relative to the common probe 27, when the main switch 55 is closed, and this high voltage is sufficient to establish a current flow from the common probe 27 to each of these first four indicator probes 28 so that the lower four probe relays 39 are energized. The drawing shows these relays de-energized, however, because the main switch 55 is shown in open condition. This relay energization opens the normally closed contact 74 thereof and closes the normally open contact 75 thereof. This means that the four lowermost green lights will be illuminated. The four uppermost electrical indicator probes are not immersed in the water but instead are immersed in the steam which has a relatively high impedance and thus insufficient current is passed from the common probe 27 to these four uppermost indicator probes 28 to energize the corresponding probe relays 39. This means that the normally closed contacts 74 thereof remain closed and the normally open contacts 75 thereof remain open. This establishes that the low voltage circuit 72 will cause illumination of the four uppermost red lamps of the first plurality of lamps 41.

Thus, for the water level 17 as shown the upper four red lights will be illuminated and the lower four green lights will be illuminated. With reference to Figures 2 and 3, this means that there will be a column of green light below a column of red light with the junction between these two illuminated columns indicating the water level. The hinged cover 50 may have water level indications thereon not shown, if desired, in order to indicate water level in inches or feet in accordance with the physical arrangement of the particular installation.

If the water level 17 goes down to uncover the fourth indicator probe 28, then the probe relay 39 corresponding thereto, which is the fourth from the bottom, will be de-energized to open its contact 75 and close its contact 74. This will extinguish the green lamp and illuminate the red lamp corresponding therewith and thus the red column will be extended and the green column shortened on the translucent cover 45. The horizontal baffles 51 prevent light from one pair of lamps in a compartment form intermingling with the light from lamps in the adjacent compartment, and yet the translucent cover 45 disburses the light sufficiently so that light from each of the eight compartments is blended together at the junction between compartments, defined by the horizontal baffles 49 and 51, and thus the observer of the gauge merely sees a column of red light immediately above a column of green light without seeing any particular distinctions between light from adjacent compartments.

The construction of the water tube 11, as shown best in Figure 1, permits several safety and convenience features as well as dependability in operation. The fact that the water tube 20 is disposed at a thirty degree angle to the horizontal means that the indicator probes 28 may be physically spaced a distance which is twice their vertical spacing. For example, the indicator probes 28 may be spaced every two inches along the pipe 20, yet there is only one inch difference in vertical spacing or elevation between the probe elements 33 and thus the entire electrical gauge will indicate one inch difference in water level. The entire water tube 11 may be made of welded steel, preferably stainless steel to avoid contamination, which will easily withstand the boiler operating pressures even as high as 3000 p. s. i. Also, the disposition of the pipe 20 at a thirty degree angle to the horizontal means that each of the insulators 32 are disposed at a sixty degree angle to the horizontal. This is a dependability feature because sediment and other contaminants cannot build up by gravity on the upper surface of the insulator 32 and thus there will be no electrical shorting between the internal probe element 33 and the water tube 11. This might be the case if the water tube 11 were mounted vertically with consequent horizontal positioning of the internal insulators 32. Therefore, the operation of the water tube 11 is more sure and dependable by placing it at this acute angle to the horizontal.

The common probe 27 has an elongated internal probe element 34 to provide a larger surface area in the water for conduction of electrical current. This common probe 27 is a common terminal for the high voltage circuit and thus could be electrically connected directly to the pipe 20; however, by providing the probe element 34 which is electrically insulated from the pipe 20, this assures that even though any one of the internal insulators 32 is shorted by foreign matter, there still is not a false indication given at the lamp housing 13. Thus, this is another safety feature to provide safe and dependable operation of the entire water gauge 15.

The lamp housing 13 may be mounted at a remote control panel for the entire boiler 12; and because there are only electrical wires interconnecting the lamp housing 13 and the water tube 11, the entire lamp housing 13 is a safe unit to be installed at the control panel. There are no high pressure steam or water lines necessary to be connected to the control panel, and there are no gauge glasses at the control panel which may be broken to create a high pressure steam hazard. Also, the low voltage circuit 72 is all that is exposed at the front of the lamp housing 13; and because this low voltage circuit may be in the order of twelve volts, there is no electrical shock hazard present again for safe operation.

The lamp housing with its plurality of red and green lamps provides a definite and positive indication of the water level by the junction of the column of red and green light. If a particular lamp is burned out or otherwise defective, then there is a gap in the column of red or green light, and thus this immediately is apparent to the personnel at the control panel so that such lamp may be immediately replaced. By thus providing a multitude of lamps, the failure of any one is thus immediately apparent and easily corrected without establishing a hazardous condition by failing to indicate a dangerous low or a high water level in the boiler 12.

The probe relays 39 are electromagnetic devices which establish selectively a red or a green illuminated portion on the translucent cover 45 so that the sum total of all the illuminated portions establishes the column of red light above the column of green light. The probe relays 39 are controlled by the electrical circuit to be responsive to and to distinguish between those indicator probes which are immersed and those which are not immersed in the relatively conducting liquid in the water tube 11.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A liquid level gauge comprising, a liquid tube and an electrical circuit, said liquid tube having first and second fluid connections, means for connecting said first and second fluid connections to provide an interface in the tube between first and second fluids in accordance with the liquid level to be measured, said first and second fluids having relatively low and high resistivity, respectively, common terminal means in said tube, and a longitudinal row of electrical indicator probes insulatively extending through the wall of said tube, said electrical circuit including two voltage terminals, a first plurality of indicator lamps and a second plurality of indicator lamps with each plurality equal in number to the number of said indicator probes and with a lamp in each plurality corresponding to one of said indicator probes, circuit element means for impressing a voltage on each of said indicator probes relative to said common terminal means from said voltage terminals to pass current between said common terminal means and those indicator probes immersed in said first liquid, circuit means including said circuit element means for effecting illumination of selected lamps of said first plurality in accordance with the immersion in said first fluid of the corresponding indicator probes, and circuit means including said circuit element means for effecting illumination of selected lamps of said second plurality in accordance with the immersion in said second fluid of the corresponding indicator probes.

2. A liquid level gauge for a tank comprising, a liquid tube and an electrical circuit, said liquid tube having first and second end connections, means for connecting said first and second end connections to said tank to provide an interface in the tube between first and second fluids in accordance with the liquid level in said tank, said first and second fluids having relatively low and high resistivity, respectively, and a longitudinal row of electrical indicator probes and common probe means insulatively extending through the wall of said tube, said electrical circuit including first and second voltage terminals, a first plurality of indicator lamps and a second plurality of indicator lamps with each plurality equal in number to the number of said indicator probes and with a lamp in each plurality corresponding to one of said indicator probes, circuit element means for impressing a voltage on each of said indicator probes relative to said common probe means from said voltage terminals to pass current between said common probe means and those indicator probes immersed in said first liquid, circuit means including said circuit element means for effecting illumination of selected lamps of said first plurality in accordance with the immersion in said first fluid of the corresponding indicator probes, and circuit means including said circuit element means for effecting illumination of selected lamps of said second plurality in accordance with the immersion in said second fluid of the corresponding indicator probes.

3. A boiler water level gauge for a steam boiler having a variable water level and gauge outlets above and below said water level, said gauge comprising, a water tube, an electrical circuit and a lamp housing, said water tube having an axis and having first and second end connections, means for connecting said first and second end connections to said boiler gauge outlets, means for mounting said water tube with said tube axis disposed at substantially thirty degrees to the horizontal, a longitudinal row of electrical probes extending through the upper wall of said tube in a vertical plane, and a probe element insulatively carried by each of said probes and extending from the outside to the inside of said tube substantially perpendicular to the tube axis, said electrical circuit including a transformer energizable from an alternating current source and having a high voltage secondary with first and second terminals, a plurality of electromagnetic devices, circuit connections for connecting each of said electromagnetic devices to said secondary first terminal and to different ones of said probe elements, and means for connecting said secondary second terminal to the lowest probe element in said tube, said lamp housing mounting lamp means, a cover in said lamp housing which is at least translucent, red and green filter means in said lamp housing, means including said filter means and lamp means for selectively establishing red and green light on said translucent cover from said lamp means, and means interconnecting said electromagnetic devices and said selective means for operating same, whereby the water level in said water tube will complete said high voltage secondary circuit between said lowest probe element and all others of said probe elements below said water level to energize the respective electromagnetic devices connected to the immersed probe elements and to maintain de-energized the remaining electromagnetic devices, whereupon said translucent cover shows a column of red light above a column of green light with the junction therebetween indicating said water level.

4. A liquid level gauge for a tank having gauge outlets, said gauge comprising, a liquid tube, an electrical circuit and a lamp housing, said liquid tube having first and second end connections, means for connecting said first and second end connections to said gauge outlets to establish a liquid level in said tube, and a row of probe elements insulatively extending to the inside of said tube for at least one of said probe elements to be immersed in said liquid, said electrical circuit including first and second energizing terminals, a plurality of electromagnetic devices, means for connecting said second terminal to the lowest probe element in said tube, and circuit connections for connecting each of said electromagnetic devices to said first terminal and to different ones of said probe elements to provide energization to selected electromagnetic devices in accordance with the immersed probe elements, said lamp housing mounting lamp means, a cover in said lamp housing which is at least translucent, red and green filter means in said lamp housing, means including said filter means and lamp means for selectively establishing red and green light on said translucent cover from said lamp means, and means interconnecting said electromagnetic devices and said selective means for operating same, whereby the liquid level in said tube will complete said electrical circuit between said lowest probe element and all others of said probe elements below said liquid level to energize the respective electromagnetic devices connected to the immersed probe elements and to maintain de-energized the remaining electromagnetic devices, whereupon said translucent cover shows a column of red light above a column of green light with the junction therebetween indicating said liquid level.

5. A water level gauge for a tank comprising, a liquid tube, an electrical circuit and a lamp housing, said liquid tube having an axis and having first and second end connections, means for connecting said first and second end connections to said tank to provide an interface in the tube between first and second fluids in accordance with the water level in said tank, said first and second fluids having relatively low and high resistivity, respectively, means for mounting said liquid tube with said tube axis disposed at substantially thirty degrees to the horizontal, and a longitudinal row of electrical indicator probes and a common probe insulatively extending through the wall of said tube, said common probe being at one end of said tube, said lamp housing including a first plurality of indicator lamps and a second plurality of indicator lamps with each plurality equal in number to the number of said indicator probes and with a lamp in each plurality corresponding to one of said indicator probes, and said electrical circuit including a transformer energizable from an alternating current source and having a high voltage secondary with first and second terminals, means for connecting said common probe to said second terminal, means including circuit elements connected to each of said indicator probes for impressing a voltage on each of said indicator probes from said first terminal to pass current between said common probe and those indicator probes immersed in said first liquid to thus pass current through selected ones of said circuit elements, circuit means including said circuit elements for effecting illumination of selected lamps of said first plurality in accordance with the immersion in said first fluid of the corresponding indicator probes and with the passage of current through said selected ones of said circuit elements, and circuit means including said circuit elements for effecting illumination of selected lamps of said second plurality in accordance with the immersion in said second fluid of the corresponding indicator probes.

6. A boiler water level gauge for a steam boiler comprising, a water tube, high and low voltage electrical circuits, and a lamp housing, said water tube having an axis and having first and second end connections, means for connecting said first and second end connections to said boiler to provide an interface in the tube between two fluids in accordance with the water level in said boiler, means for mounting said water tube with said tube axis disposed at substantially thirty degrees to the horizontal, and a longitudinal row of electrical probes insulatively extending through the wall of said tube, said high voltage electrical circuit including first and second voltage terminals, a plurality of relays, circuit connections for connecting each of said relays to a probe and to said first terminal, and means for connecting said second terminal to a common probe at one end of said tube, said low voltage circuit including, third and fourth voltage terminals, a normally closed and a normally open contact on each of said relays, a plurality of green lamps and a plurality of red lamps with each plurality equal in number to the number of said relays, a common connection interconnecting all of said lamps and said third terminal, a connection from said fourth terminal to each of said relay contacts, connections from each of said green lamps to different ones of said normally open contacts, and connections from each of said red lamps to different ones of said normally closed contacts, and said lamp housing mounting said green and red lamps in first and second vertical and coextensive rows with baffles between each of said lamps.

7. A boiler water level gauge for a steam boiler comprising, a water tube, high and low voltage electrical circuits, and a lamp housing, said water tube having an axis and having first and second end connections, means for connecting said first and second end connections to said boiler, means for mounting said water tube with said tube axis disposed at substantially thirty degrees to the horizontal, and a longitudinal row of electrical probes insulatively extending through the wall of said tube, said high voltage electrical circuit including a transformer energizable from an alternating current source and having a high voltage secondary with first and second terminals, a plurality of relays, circuit connections for connecting each of said relays to a probe and to said secondary first terminal, and means for connecting said secondary second terminal to the lowest probe in said tube, said low voltage circuit including, a second transformer energizable from an alternating current source and having a low voltage secondary with third and fourth terminals, a normally closed and a normally open contact on each of said relays, a plurality of green lamps and a plurality of red lamps with each plurality equal in number to the number of said relays, a common connection interconnecting all of said lamps and said secondary third terminal, a connection from said secondary fourth terminal to each of said relay contacts, connections from each of said green lamps to different ones of said normally open contacts, and connections from each of said red lamps to different ones of said normally closed contacts, and said lamp housing mounting said green and red lamps in first and second vertical and coextensive rows with baffles between each of said lamps.

8. A boiler water level gauge for a steam boiler comprising, a water tube, high and low voltage circuits, and a lamp housing, said water tube having an axis and having first and second end connections, means for connecting said first and second end connections to said boiler, means for mounting said water tube with said tube axis disposed at substantially thirty degrees to the horizontal, a longitudinal row of electrical probes extending through the upper wall of said tube, and a probe element insulatively carried by each of said probes and extending from the outside to the inside of said tube, said high voltage electrical circuit including a high voltage winding with first and second terminals, a plurality of probe relays, circuit connections for connecting each of said probe relays to said winding first terminal and to different ones of said probe elements, and means for connecting said second terminal to the lowest probe element in said tube, said low voltage circuit including a low voltage winding with third and fourth terminals, a normally closed and a normally open contact on each of said relays, first and second series of signal lamps, a common connection interconnecting all of said lamps and said winding third terminal, a connection from said winding fourth terminal to each of said relay contacts, connections from each lamp of said first series to different ones of said normally open contacts, and connections from each lamp of said second series to different ones of said normally closed contacts, and said lamp housing mounting said first and second series of lamps in first and second vertical and coextensive rows, means for establishing green and red light from said first and second series of lamps, respectively, whereby the water level in said water tube will complete said high voltage circuit between said lowest probe element and all others of said probe elements below said water level to energize the respective relays connected to the immersed probe elements and to maintain de-energized the remaining relays, whereupon lamps of said first series corresponding to said immersed probe elements are illuminated and lamps of said second series corresponding to the non-immersed probe elements are illuminated.

9. A boiler water level gauge for a steam boiler having a variable water level and gauge outlets above and below said water level, said gauge comprising, a water tube, high and low voltage circuits, and a lamp housing, said water tube having an axis and having first and second end connections, means for connecting said first and second end connections to said boiler gauge outlets, means for mounting said water tube with said tube axis disposed at substantially thirty degrees to the horizontal, a longitudinal row of electrical probes extending through the upper wall of said tube in a vertical plane, and a probe element insulatively carried by each of said probes and extending from the outside to the inside of said tube substantially perpendicular to the tube axis, said high voltage electrical circuit including a transformer energizable from an alternating current source and having a high voltage secondary with first and second terminals, a plurality of probe relays, circuit connections for connecting each of said probe relays to said secondary first terminal and to different ones of said probe elements, and means for connecting said secondary second terminal to the lowest probe element in said tube, said low voltage circuit including, a second transformer energizable from an alternating current source and having a low voltage secondary with third and fourth terminals, a normally closed and a normally open contact on each of said relays, first and second series of signal lamps with each series equal in number to the number of said relays, a common connection interconnecting all of said lamps and said secondary third terminal, a connection from said secondary fourth terminal to each of said relay contacts, a connection from each lamp of said first series to a different one of said normally open contacts, and a connection from each lamp of said second series to a different one of said normally closed contacts, and said lamp housing mounting said first and second series of lamps in first and second vertical and coextensive rows, baffles between each of said lamps, a green light filter in front of said row of first series of lamps, a red light filter in front of said row of second series of lamps, and a cover which is at least translucent in front of both filters, whereby the water level in said water tube will complete said high voltage circuit between said lowest probe element and all others of said probe elements below said water level to energize the respective relays connected to the immersed probe elements and to maintain de-energized the remaining relays, whereupon lamps of said first series corresponding to said immersed probe elements are illuminated and lamps of said second series corresponding to the non-immersed probe elements are illuminated.

References Cited in the file of this patent

UNITED STATES PATENTS

| | | |
|---|---|---|
| 1,281,013 | Humphreys | Oct. 8, 1918 |
| 1,388,479 | Nickum | Aug. 23, 1921 |
| 2,678,434 | Brown | May 11, 1954 |

FOREIGN PATENTS

| | | |
|---|---|---|
| 666,177 | Germany | Oct. 13, 1938 |